(12) United States Patent
Glöckner et al.

(10) Patent No.: US 6,211,968 B1
(45) Date of Patent: Apr. 3, 2001

(54) METHOD OF REGULATING A WEB TENSION

(75) Inventors: Erhard Herbert Glöckner, Eibelstadt; Rüdiger Karl Seyfried, Zell/Main, both of (DE)

(73) Assignee: Koenig & Bauer-Albert Aktiengesellschaft, Wurzburg (DE)

( * ) Notice: Subject to any disclaimer, the term of this patent is extended or adjusted under 35 U.S.C. 154(b) by 0 days.

(21) Appl. No.: 08/981,501

(22) PCT Filed: Jul. 10, 1996

(86) PCT No.: PCT/DE96/01241

§ 371 Date: Jan. 9, 1998

§ 102(e) Date: Jan. 9, 1998

(87) PCT Pub. No.: WO97/02952

PCT Pub. Date: Jan. 30, 1997

(30) Foreign Application Priority Data

Jul. 11, 1995 (DE) ................................. 195 25 170

(51) Int. Cl.[7] .................................................... G03F 15/00
(52) U.S. Cl. ...................... 358/1.4; 358/1.12; 399/165; 399/278
(58) Field of Search ............................ 358/1.1, 1.4, 1.12, 358/1.13; 271/20, 104, 105, 176, 183, 195; 399/165, 228, 278, 288

(56) References Cited

U.S. PATENT DOCUMENTS

| 4,667,946 | 5/1987 | Taguchi et al. ............. 270/52.11 |
|---|---|---|
| 5,231,452 | 7/1993 | Murayama et al. ............. 399/42 |
| 5,290,023 | 3/1994 | Sasaki et al. ............. 271/20 |
| 5,430,642 | 7/1995 | Nakajima et al. ............. 700/50 |
| 5,541,832 | 7/1996 | Nakajima et al. ............. 700/28 |
| 5,582,400 | 12/1996 | Seydel ............. 271/176 |

FOREIGN PATENT DOCUMENTS

| 2 122 416 | 11/1972 | (DE) . |
|---|---|---|
| 35 37 014 | 4/1986 | (DE) . |
| 42 13 541 | 10/1992 | (DE) . |
| 42 27 814 | 9/1994 | (DE) . |
| 43 08 194 | 9/1994 | (DE) . |
| 43 28 445 | 3/1995 | (DE) . |
| 44 39 986 | 6/1995 | (DE) . |
| 0 460 892 | 2/1991 | (EP) . |
| 2 236 983 | 4/1991 | (GB) . |
| 5330710 | * 11/1991 | (JP) . |
| WO86/01155 | 2/1986 | (WO) . |
| WO 86/01155 | * 11/1991 | (WO) . |

OTHER PUBLICATIONS

Patent Abstracts of Japan; JP 2043159; Feb. 1990; vol. 14; No. 206.
Patent Abstracts of Japan; JP 3180205; Aug. 1991; vol. 15; No. 427.
Patent Abstracts of Japan; JP 4345459; Jan. 1992; vol. 17; No. 201.
Patent Abstracts of Japan; JP 5111998; May 1993; vol. 17; No. 469.
Patent Abstracts of Japan; JP 5330710; Dec. 1993; vol. 18; No. 160.
"Fuzzy Logic and Fuzzy Control"; Clear Applications of Fuzzy Logic Hellendoorn; Pub. Oct. 17, 1991; IEEE Symposium 1991; pp. 57–82.
"Fuzzy Control–An Introduction into Inaccuracy"; Einführungsaufsatz; Abel; Dec. 1991; pp. 433–438.

* cited by examiner

Primary Examiner—Edward Coles
Assistant Examiner—Mark Wallerson
(74) Attorney, Agent, or Firm—Jones, Tullar & Cooper, PC

(57) ABSTRACT

A process for adjusting a web tension in a web-fed rotary printing machine addresses the problems of processing variables which are not precisely quatifiable, while minimizing the influence of the press operator. This is achieved by adjusting the web tension using rules of fuzzy logic.

10 Claims, 1 Drawing Sheet

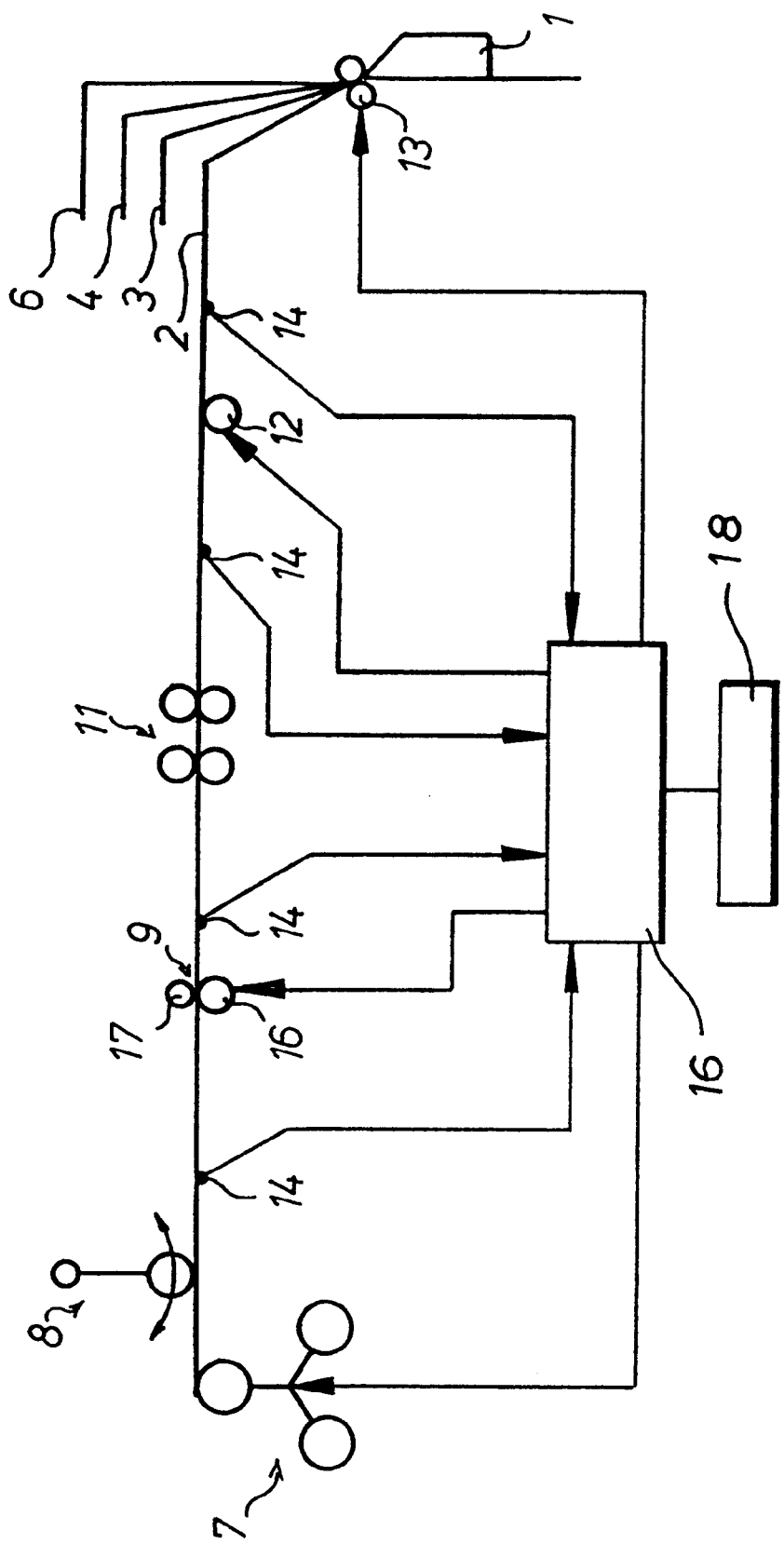

METHOD OF REGULATING A WEB TENSION

FIELD OF THE INVENTION

The present invention relates to a method for regulating a web tension of webs in a web-fed rotary printing press.

DESCRIPTION OF THE PRIOR ART

The regulation of the web tension of webs in a web-fed rotary printing press is a complex procedure. A multitude of variables, in particular a multitude of not exactly quantifiable variables, are all a part of this web tension regulation procedure, and must all be linked with each other while taking them into consideration. This linkage is typically the job of an operator and depends on his experience.

It is disadvantageous that the quality of the regulation of the web tension which can be achieved in this way is a function of the subjective judgements and experiences of the operator, and is very difficult to reproduce.

WO-A-86/01155 discloses a method for the regulation of the web tension of webs in a web-fed rotary printing press. In this case a value of the web tension of each web involved is detected as the input quality for regulation.

JP-A-2 043 159 describes a funnel inlet roller with several webs. The web tension of these webs is fixed in such a way that the web tension of the lowermost web is the greatest.

JP-A-3 180 205 describes a regulation of a web tension by means of fuzzy regulation.

SUMMARY OF THE INVENTION

It is the object of the invention to create a method for regulating the web tension of webs web-fed rotary printing press.

This object is attained in accordance with the invention by detecting a value for the tension of each web in the web-fed rotary printing press. Various other input quantities, such as those describing the state of the press, or method-related input quantities are also detected and are processed. These input quantities are quantitatively characterized by linguistic rules and are described by association functions. True values are formed from these association functions. So-called fuzzy logic rules are formulated and are linked together to process these true values. The association values formed on the basis of fuzzy logic rules are backformed into defined numerical values for the generation of discrete manipulated variables for affecting the tension of the web. In a web-fed press which utilizes a funnel-inlet roller, the web tension of the lowermost web is the greatest and the web tension of the uppermost web is the least. The tension of each web is initially performed by one draw-in unit.

The advantages which can be attained by means of the present invention reside in particular in that the operation of web-fed rotary printing presses is made simpler, and no highly qualified, experienced operators are required. The danger of web tearing is reduced, and the web tension is optimized by the regulation of the present invention, which to a large extent, is independent of people. This leads to higher print quality and to increased productivity. Next to exact adjustment values, for example minimal and maximal web tension, it is also possible to process vague statements, for example in relation to the material, such as the paper quality, rubber blanket projection, dampening water guidance, by means of which it is possible to more exactly model the regulated behavior of the web-fed rotary printing press. It is then possible to employ sensors of lesser resolution or with discrete output areas. It is possible to process large amounts of data in a short time by means of the method in accordance with the present invention.

BRIEF DESCRIPTION OF THE DRAWING

A schematic web guidance track of a web-fed rotary printing press is represented in the sole drawing FIGURE, and the method of regulating web tension, in accordance with the present invention will be described in more detail in what follows.

DESCRIPTION OF THE PREFERRED EMBODIMENT

A number of webs, in the present example four such webs 2, 3, 4, and 6, for example paper or foil webs, are fed to a folding apparatus 1 of a web-fed rotary printing press, as seen in the sole drawing FIGURE. For example, in this case a reel star 7, a dancing roller 8, a web draw-in unit 9, a print unit 11 and a drawing roller 12 placed downstream of the print unit 11 are arranged along the depicted web guidance track, for web 2 before the respective webs 2, 3, 4, 6 are brought together on a funnel inlet roller 13. A web tension measuring sensor 14 is respectively arranged between the dancing roller 8 and the draw-in unit 9, between the draw-in unit 9 and the print unit 11, between the print unit 11 and the drawing roller 12 and between the drawing roller 12 and the funnel inlet roller 13. Only one web 2 is represented and described by way of example, wherein the remarks also apply to the other web guidance tracks for the three other webs 3, 4, and 6.

A roll-off speed of the web 2 from the roll, i.e. the web tension between the reel star 7 and the draw-in unit 9, is regulated by means of the dancing roller 8. To this end, the dancing roller 8 is pivotably seated and a force corresponding to a predetermined set value of the web tension acts on it, for example by means of a pneumatic cylinder. The position of the dancing roller 8 is evaluated by means of a sensor continuously and simultaneously or periodically. This position of the dancing roller 8 represents a measure of the actual value of the web tension between the reel star 7 and the draw-in unit 9. Based on a comparison of the measured actual value with the predetermined set value of the web tension, the roll-off speed of the web from the reel star 7 is changed. When presetting the set value for the web tension, the width of the web 2 is taken into consideration. The draw-in unit 9 is embodied as a pair of drawing rollers, wherein a circumferential speed of a drawing roller 16 of the draw-in unit 9 can be changed by means of a sensitive adjustment gear or by an electric drive, and a contact pressure roller 17 of the draw-in unit 9 is charged with a force for clamping the web 2 between the contact pressure roller 17 and the drawing roller 16. It is intended, by means of this, to assure an almost slip-free transport of the web 2. The regulation of the web tension takes place by means of a change in the rpm of the drawing roller 16, for which reason the width of the latter is independent of the width of the web 2.

The drawing roller 12 is designed to be adequate for the draw-in unit 9. It is therefore possible to change the circumferential speed of the drawing roller 12 in relation to the print unit 11. If the circumferential speed of the drawing roller 12 is increased, the web tension upstream of the drawing roller 12 is increased and is reduced downstream of the drawing roller 12. When reducing the circumferential speed of the drawing roller 12, the web tension upstream of the drawing roller 12 is reduced and is increased downstream of the drawing roller 12.

The change of the web tension upstream of the funnel inlet roller 13 takes place, as with the drawing roller 12, by changing the rpm of the funnel inlet roller 13.

The regulation of the web tension takes place as follows: The actual values detected by the web tension measuring sensors 14 are used as the input quantities for the regulation. In addition, further properties describing the press condition, such as press speed, press acceleration, production paths or number of webs and roll changes, as well as properties relating to the method, such as the amount of ink, the type of ink, the subject, and the amount of dampening agent, are passed on by means of sensors to a regulating device 16, such as a computer as further input quantities. It is important that in addition it is possible to preselect web-specific parameters, such as characteristic tension/extension curves for various amounts of moisture content, penetration behavior and tear resistance of the web 2, by means of an input station 18, such as a keyboard. These parameters often are not present as exact numerical values, so that an operator can only make "indistinct" statements, such as "solid paper of little moisture absorbency". All, or respectively a part of these input quantities are quantitatively characterized by linguistic rules and are described by association functions. True values are then formed from these association functions.

Linguistic rules, or so-called "fuzzy rules" are formed and are linked together for processing these true values. The strategy for determining the regulation behavior is fixed by means of this. In the present configuration, the regulating behavior is essentially determined by the following regulating strategy:

After determination of all true values, in particular by means of the web tension measuring sensors 14, these true values of the tension in webs 2, 3, 4, 6 are compared with each other. A rule for the web tension, which always must be complied with a "min/max rule", applies, so that the web tensions all may not be too low, for example, the web tension in each web may not be less than 8 daN/m, but also may not be too high, for example, web tension in each web must be no greater than 50 daN/m. If the web tension is too low, the danger of the web 2 running off-center is great, and with too high a web tension, the danger of a tear in the web 2 is great. Following checking and possible readjustment of the tension of the web 2 in accordance with the "min/max rule", a check of the web tension of the respective webs 2, 3, 4, and 6 at the funnel inlet roller is performed. In this case, the rule applies that the lowermost web 2 should have the highest web tension, and the uppermost web 6 should have the lowest web tension. In addition, the web tension of the respective webs 2, 3, 4, 6 should be set as regularly as possible in steps from the inside to the outside or the lowermost to the uppermost. To comply with these rules, first a change of the tension of the web 2 at the draw-in unit 9 is performed. A change of the tension at the draw-in unit 9 causes a change in the tension as far as the folding apparatus 1. In the process, the rule must be observed that the tension of the web 2 upstream of the print unit 11 should not fall below a medium value range (for example approximately 20 to 22 daN/m). If the regulation of the tension of the web 2, taking the "min/max rule" into account, is not sufficient along the entire web guidance track by adjustment of the draw-in unit 9, an additional adjustment is made by means of the drawing roller 12. Reproductions of human action patterns, which are characterized by indistinct statements, are possible by means of such fuzzy rules which are provided as part of the information in the regulating device or computer 16.

To generate the discrete manipulated variables required for affecting the web tension by means of, for example, the reel star 7, the draw-in unit 9, the drawing roller 12 and the funnel inlet roller 13, the association functions formed on the basis of fuzzy rules are backformed into definite numerical values. This "defuzzyfication" is performed, for example, by means of the center of gravity method.

Preset data from previous productions, or the manually preset values can also be used as input quantities for this fuzzy regulation.

It is furthermore possible to combine the fuzzy regulator with the learning principles of neuronal networks. By means of this, the fuzzy regulators can learn their fuzzy rules and association functions from the input quantities.

The regulation in accordance with the present invention can include the entire web-fed rotary printing press, or can also automatically regulate partial areas. However, in all cases a switch to completely manual control is possible. In this case the method steps described by means of fuzzy rules are performed manually or by means of a conventional control.

While a preferred embodiment of a method for regulating a web tension in accordance with the present invention, has been set forth fully and completely hereinabove, it will be apparent to one of skill in the art that a number of changes in, for example, the type of printing press, the specific drive for the printing press, the type of printing being done and the like can be made without departing from the true spirit and scope of the present invention, which is accordingly to be limited only by the following claims.

What is claimed is:

1. A method for regulating web tension in a plurality of webs in a web-fed rotary printing press including:
   detecting an actual valve for a web tension of each of a plurality of webs;
   providing a regulating device and supplying each said actual valve for a web tension to said regulating device;
   detecting input quantities describing the state of the web-fed rotary printing press and processing said input quantities in said regulating device;
   quantitatively characterizing said input quantities by linguistic rules and describing said input quantities by association functions;
   forming true values from said association function;
   formulating fuzzy logic rules and linking said fuzzy logic rules together;
   processing said true values using said fuzzy logic rules;
   backforming defined numerical values from said true values formed on the basis of said fuzzy rules; and
   affecting a tension of each of said plurality of webs by generating discrete manipulated variables and providing said discrete manipulated variables to the web-fed rotary printing press.

2. The method of claim 1 further including using press speed, press acceleration, numbers of said plurality of webs and roll changes as said input quantities.

3. The method of claim 1 further including using an amount of ink, a type of ink, and an amount of a dampening agent as said input quantities.

4. The method of claim 1 further including using web characteristic tension/extension curves, penetration behavior, and tear resistance of said plurality of webs as said input quantities.

5. The method of claim 1 further including directing said plurality of webs to a funnel inlet roller and using said fuzzy logic rules for adjusting said web tensions wherein a web tension of a lowermost one of said plurality of webs is the greatest and a web tension of an uppermost one of said plurality of webs is the least.

6. The method of claim 1 further including directing said plurality of webs to a funnel inlet roller and using said fuzzy logic rules to vary said web tension in said plurality of webs in stages so that said web tension becomes less from a lowest one of said plurality of webs to an upper most one of said plurality of webs.

7. The method of claim 1 further including a web draw-in unit for each said web, and providing one of said fuzzy logic rules for determining that regulation of said web tension of each of said plurality of webs is initially performed at said web draw-in unit for each of said plurality of webs.

8. The method of claim 7 further including a drawing roller for each of said webs, and a print unit for each of said webs and locating said drawing roller downstream of said printing unit and further regulating said web tension for each said web by said drawing roller only if said regulation of said web tension by said draw-in unit has been exhausted within predetermined threshold areas.

9. A method for regulating a web tension in each of a plurality of webs in a web-fed rotary printing press including:
   providing a draw-in unit for each of said webs;
   passing each said web through its associated one of said draw-in units;
   directed said plurality of webs from said draw-in units to a funnel inlet roller;
   arranging said plurality of webs at said funnel inlet roller from a lowermost web to an uppermost web;
   providing said web tension in each of said plurality of webs from a greatest at said lowermost web to a least at said uppermost web; and
   regulating said web tensions using said draw-in units.

10. The method of claim 9 further including locating a print unit and a drawing roller downstream of each other and of said draw-in unit, in a direction of web travel for each of said plurality of webs, and using said drawing roller to regulate said web tension of each of said plurality of webs only if said draw-in unit for each said web has been exhausted within predetermined threshold areas.

\* \* \* \* \*